Figure 1:
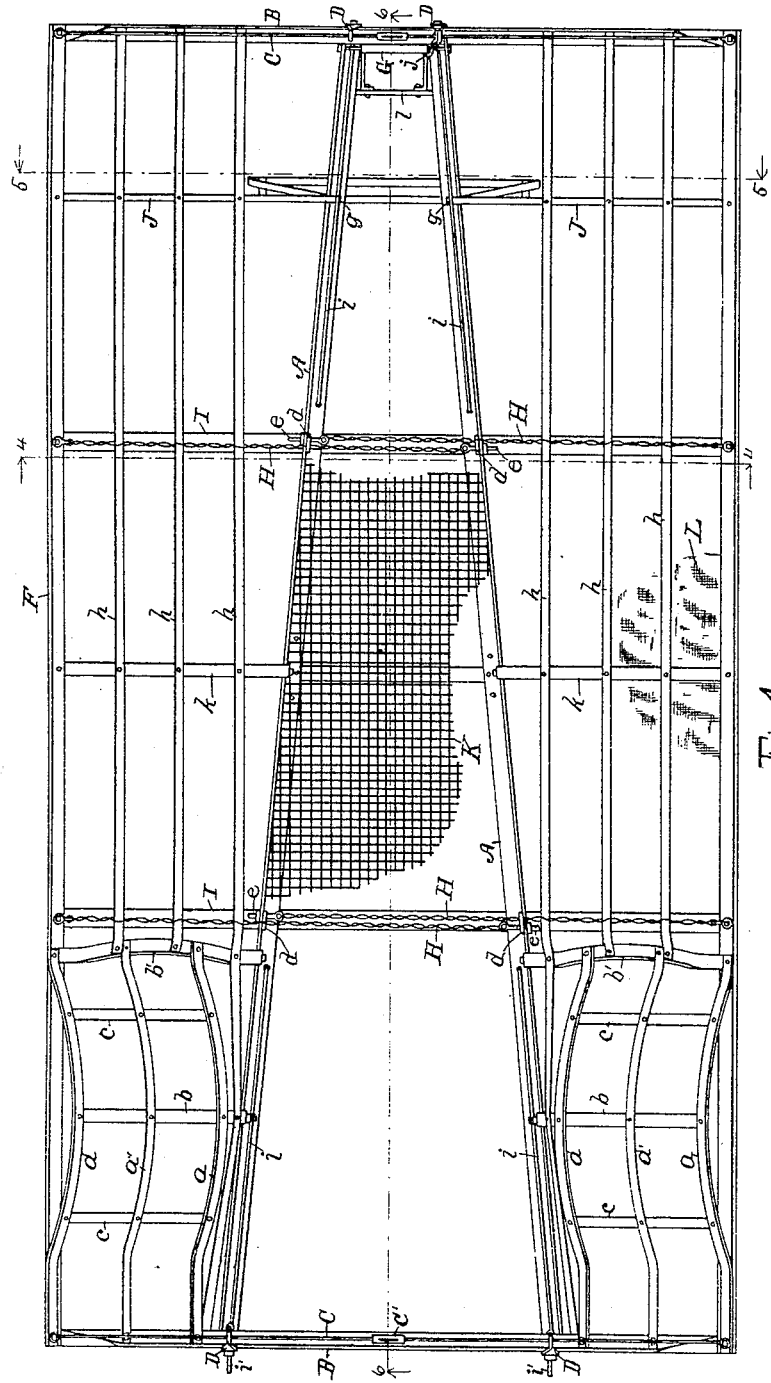

(No Model.) 3 Sheets—Sheet 1.

G. A. & G. E. NIDY.
METAL HAY RACK.

No. 551,225. Patented Dec. 10, 1895.

Witnesses:
Walter S. Wood
Marian Longyear

Inventors:
George A. Nidy & George E. Nidy
By Fred L. Chappell
Att'y.

(No Model.) 3 Sheets—Sheet 2.

G. A. & G. E. NIDY.
METAL HAY RACK.

No. 551,225. Patented Dec. 10, 1895.

Witnesses: Inventors:

(No Model.) 3 Sheets—Sheet 3.
G. A. & G. E. NIDY.
METAL HAY RACK.
No. 551,225. Patented Dec. 10, 1895.
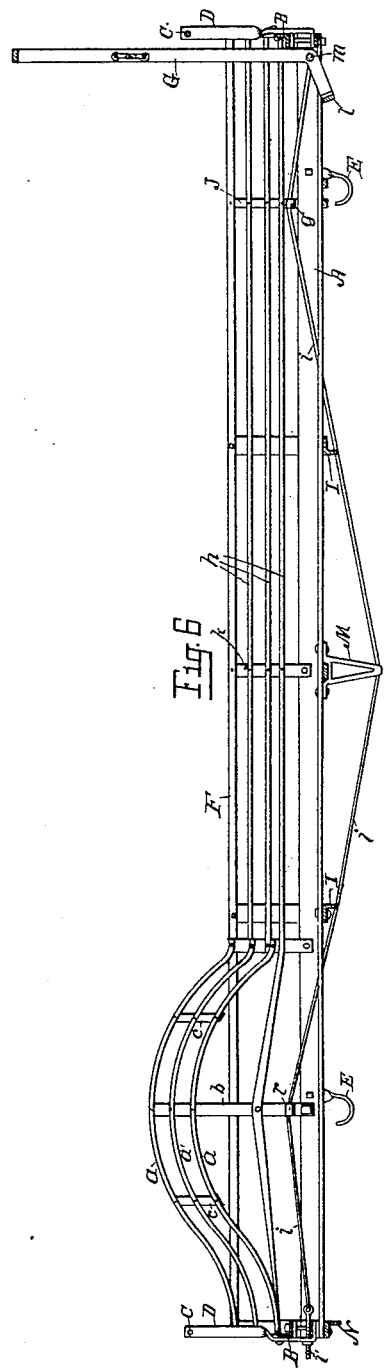
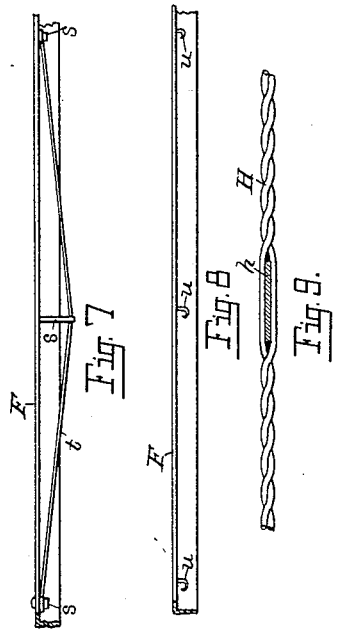
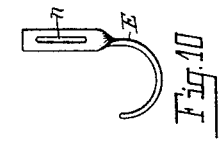
Witnesses:
Walter S. Wood
Marian Longyear
Inventors:
George A. Nidy and George E. Nidy
By Fred L. Chappell
Att'y.

UNITED STATES PATENT OFFICE.

GEORGE A. NIDY, OF KALAMAZOO, AND GEORGE E. NIDY, OF FULTON, MICHIGAN.

METAL HAY-RACK.

SPECIFICATION forming part of Letters Patent No. 551,225, dated December 10, 1895.

Application filed January 15, 1895. Serial No. 534,962. (No model.)

*To all whom it may concern:*

Be it known that we, GEORGE A. NIDY, residing at the city of Kalamazoo, and GEORGE E. NIDY, residing at the village of Fulton, in the county of Kalamazoo and State of Michigan, citizens of the United States, have invented certain new and useful Improvements in Metal Hay-Racks, of which the following is a specification.

Our invention relates to improvements in hay-racks, and more particularly to metal hay-racks.

As hay-racks have been constructed heretofore, they have been made of wood, which of necessity has to be made very heavy in order to secure the required strength, and in making the parts sufficiently heavy and strong the form of the hay-rack has been such that the outer edge of the same was raised very much higher than the wheels, and this was required on account of the nature of the material, making it impossible to properly house the hind wheels of the wagon or other vehicle. Another objection to the old style rack being made low is that it will interfere with the proper turning of the wagon. By constructing the rack of metal, properly arranged and put together, we find by actual experience that all of these difficulties are obviated, and we secure a rack which is so light that one man can handle it with ease and yet so strong that it will hold all the load that a team can draw and is of such height that it is easy for a man pitching the load upon it to pitch on the entire load, as he will not be obliged to raise the same very high above the ground. By our special construction our rack is very stable and yet the wagon can make a very short turn.

The objects of our invention are therefore, first, to produce a very light rack which shall be strong and durable; second, to so construct a hay-rack that the sides of the same will not be elevated high above the ground when it is placed on a wagon; third, to provide improved means of holding a rack upon the wagon; fourth, to provide a rack so constructed that it shall be of very large capacity in proportion to its weight; fifth, to provide a rack that shall be convenient and easy to handle; sixth, to provide a low-down rack that will permit of a short turning of the wagon. We accomplish these objects of our invention by the devices shown in the accompanying drawings, in which—

Figure 2:
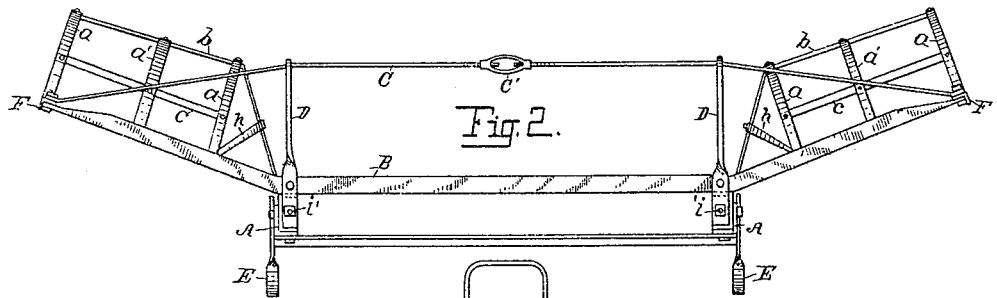
Figure 3:
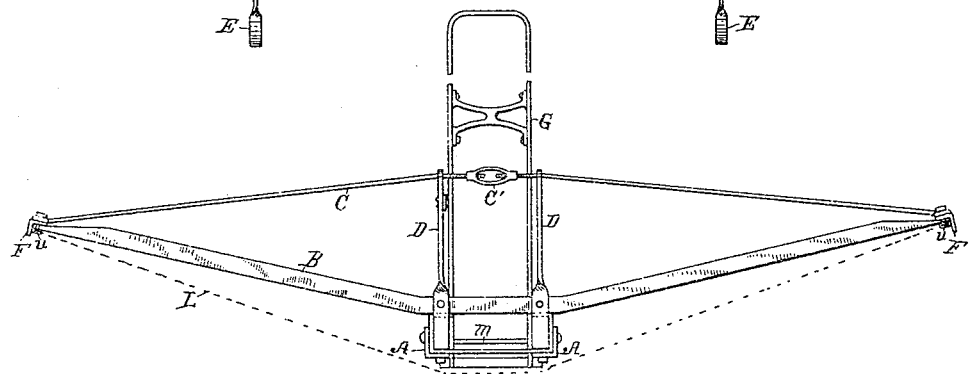
Figure 4:
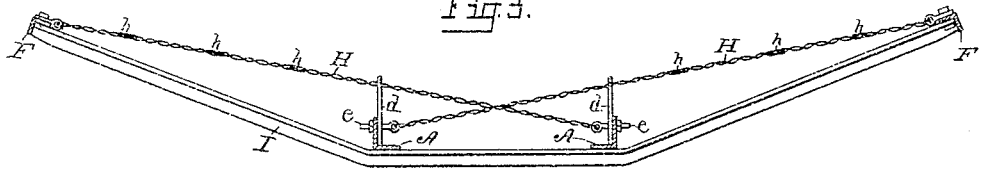
Figure 5:
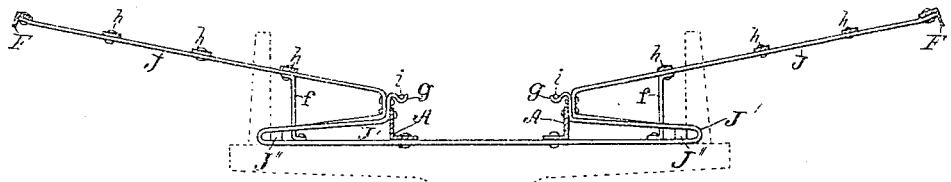

Figure 1 presents a top plan view of our improved hay-rack, no wagon or other vehicle being shown in connection. Fig. 2 presents a rear end elevation. Fig. 3 is a front end elevation. Fig. 4 is a sectional view on line 4 4 of Fig. 1, looking in the direction of the little arrows. Fig. 5 is a sectional view on line 5 5 of Fig. 1, looking in the direction of the little arrows at the ends of the section-lines, a bolster and bolster-stakes being shown in dotted lines. Fig. 6 is a longitudinal sectional view on line 6 6 of Fig. 1. Fig. 7 is an enlarged detail sectional view of a modification of one of the outer rails of the rack. Fig. 8 shows a view of one of the outer rails containing hooks provided for the convenient attachment of canvas. Fig. 9 is a detail view of the method of attaching the longitudinal strips at the side. Fig. 10 is an enlarged detail of the part E for securely attaching the rack to the bolster of wagons or other vehicles.

In the drawings all of the sectional views are taken looking in the direction of the little arrows at the ends of the section-lines.

Similar letters of reference refer to similar parts throughout the several views.

Referring to the lettered parts of the drawings, A A are the bed-pieces of the rack, which are of angle-iron, with the forward ends closer together than the rear ends.

B B are the end pieces, which are also of angle-iron, the ends of which are bent to give the sides of the rack the appropriate slope toward the center. The rear end piece B is secured to the bed-pieces A by the posts D by suitable rivets or bolts or by any suitable clip, or both. Through eyes in the top of the posts D extend rods C, which are united at the center by turnbuckles C', and to the outer ends of the cross-piece B by bolts. This connection by the turnbuckle permits of adjustment so that the parts of the brace can be drawn taut. The construction serves as a truss to give additional strength to the material, which would probably not be sufficient to stand the strain unaided by the truss if heavily loaded, the truss permitting very light material to be used. The forward end of the rack is constructed in much the same way, except that the forward ends of the bed-pieces A are closer together, as will be readily seen by inspecting Fig. 3. Secured to these end pieces of the rack and extending from the front corners to the rear corners are side pieces F, which are constructed also of angle-iron, as will be readily understood on an examination of the details shown in Figs. 7 and 8 along with the views in Figs. 2, 3, 4, and 5. These are firmly secured to the corners by suitable bolts. At convenient points under intermediate portions of the rack are placed the cross-pieces I, which are made of angle-iron and are secured to the side pieces F' and to the bed-pieces A by suitable bolts or rivets. At the point of attachment to the bed-pieces A to the cross-pieces I are attached suitable upwardly-projecting arms or struts $d$. Attached by suitable means to the outer rails F are suitable truss connections H, which are preferably made of twisted wire. These pass over the struts $d$ from each side and connect to the bed-pieces A on the opposite side and serve to form, along with the cross-pieces I and struts $d$, trusses to support the rack. In the rack of the size we have shown two of these cross-pieces I and their trusses are shown. These truss connections H are united to the bed-pieces by the eyebolts $e$, which have a long threaded portion which permits of their being adjusted and drawn tight. Intermediate cross-pieces of simple band-iron $k$ are employed to hold the slats $h$ in position. These slats $h$ are held in position at the cross-pieces I in the truss connections H (which are made of double wire, twisted) by being twisted in between the wires, as indicated in Fig. 9, the position being shown in Figs. 1 and 4.

To the rear end of the rack wheel-houses are constructed to each side to properly protect the rear wheels and hold the load from bearing upon the same. These are constructed independent of the pieces $h$ by inserting additional cross-pieces $b'$ to each side of the rack and curving the strips $a$ $a'$ $a$ up into arches over the wheel and connecting them to the rear cross-piece B. These are joined together near each end by the cross-pieces $c$ and at the center by the strip $b$, which passes down and connects to the bed-pieces A of the rack, staying the whole. The inner slat $h$ extends the whole length of the rack and is riveted or bolted to the pieces $b$ to each side. This forms a perfect protection for the rear wheels of the vehicle.

The standard G at the front of the rack is composed of two upright strips of iron united at the top with the appropriate steps between. This standard is pivoted on the rod $m$, the lower ends of which bar are bent to the rear and are connected together by the cross-piece $l$. The ends of the arms project out under the bed-pieces A of the rack. A spring $j$ (see Figs. 1 and 3) is adapted to engage the standard when it is raised up and prevent its being folded back, and the cross-piece $l$, in connection with the pivot-rod $m$, holds the standard very securely in place, preventing its being tipped toward the front.

The forward portion of the rack is adapted to the bolster by being constructed as shown in Figs. 1, 5, and 6. Extending under the bed-pieces A, which at this point are near together, are strips J J'. These extend out along the bolster to the width of the rack and then fold back and are united together and to the side pieces A to form a brace and support for the same. One of the pieces J' is turned over toward the center and formed into a hook $g$. The other piece J extends through to the outside of the rack and serves as a connection for the slats $h$ $h$ $h$, &c. A brace $f$ is placed over the bolster and connects the strips J J' together, so that they engage each side of the stakes of the bolster, (see Fig. 5,) which are indicated by dotted lines.

To make the bed-pieces strong, the truss-rod $i$ is connected to the front of the bed-piece of the rack, then passed up over the hooks $g$ near the forward bolster, as indicated in Fig. 5, then down under the cross-piece I, under the strut M, under the rear cross-piece I, up over the hook $r$, then down to the rear end of the bed-piece B, where it is connected by an eyebolt $i'$, having a long thread which permits of the same being adjusted to draw the same taut and give the material its full strength.

When the rack is intended for use for drawing very large loads and is made very long for that purpose, the brace-rods $t$ should be inserted under the side rails F to each side of the central portion to strengthen that part of the rack; but for ordinary loads and purposes this will not be required.

To the bed-pieces of the rack A and each side of the point of adjustment of the bolster are secured four metal hooks E, having slots $n$, through which a bolt passes to secure them to the side pieces A. These hooks E are designed to hook under both the forward and rear bolster and be drawn up tight and secured in place by tightening the bolts. This secures the rack firmly on the wagon and prevents the same from overturning independent of the wagon. This is very desirable where the rack is so light, because the weight of a single person to one side of the empty rack would tip the same from the wagon, raising it out from between the bolster-stakes.

Between the bed-pieces A of the rack we prefer to have a heavy netting of woven wire, (indicated at K,) the meshes of which can be made of various sizes and in various directions to suit the taste or judgment of the user. Of course the usual boards in the center of the rack can be used either with or without this wire-meshing. Where our rack is used to haul grain, a canvas L can be supported under the rack (see Fig. 1 and dotted lines in Fig. 3) by providing hooks $u$ for attaching the same. This canvas will only be needed in case the grain is being hauled upon the rack and is dry enough to shell badly.

We desire to state that our improved hay-rack can be considerably varied in its details without departing from our invention. The turnbuckles $C'$ can be dispensed with in the truss-rods C, although they enter into the combination and make it very effective. The bed-pieces A can be made very heavy to dispense with the brace-rods $i$; but the construction we have shown in that particular possesses great advantages in much reducing the weight. The hooks E could be constructed without the slot $n$ and can be used on almost any hay-rack. Any ladder can be used in place of the ladder or standard G by providing suitable means of attaching the same, and other variations in the construction will readily suggest themselves to those skilled in the art to which this pertains. The construction we have shown we belive to possess great merit over any other in all of its details.

Having thus described our invention, what we claim as new, and desire to secure by Letters Patent, is—

1. In a hay rack, the combination of the angle iron bed pieces, A, A, closest together at the forward end; the angle iron pieces, B, the outer ends of which are bent upward to give the rack its appropriate form; intermediate cross pieces, I, attached to the under side of said bed pieces, A, and bent up to an angle to correspond with the end pieces; side pieces, F, uniting said end pieces and cross pieces; struts, D, D, and truss rods, C, containing turn-buckles, $C'$, at each end of said rack to strengthen the end pieces; struts $d$, and truss rods, $h$, composed of twisted wire to strengthen the intermediate cross pieces, I; slats, $h$, $h$, attached to said end pieces and passed between the wires of the truss stays, H; bent cross pieces, K, riveted to the slats, $h$; and bent cross pieces, J, J', attached to the under front side of the bed pieces and separated to engage each side of the bolster post and united cross pieces, J'', uniting the same together to properly engage the forward bolster, the outer ends of the strip, J, being extended and uniting to the slats, $h$, $h$, &c. to either side; the wheel houses to the rear of said rack and composed of the strips, $a$, $a'$, $a$, united to the cross strip, $b'$, and to the rear end pieces, B, and united together by the cross pieces, $c$, and central cross pieces, $b$, which pass down and unite to each bed piece, A; the truss rods, $i$, corresponding to each bed piece, A, and connected to the front ends of the same passing up, over the hook, $g$, down, under the front cross piece, I, under the strut, M, under the rear cross piece, I, over the hook, $r$, and connected to the end of said bed piece by an eye bolt, $i'$, with a long thread; hooks, E, attached to said bed pieces and adapted to engage under the bolster to hold all in place; a standard, G, pivoted on the rod, $m$, with rearwardly extending arms attached to the cross piece, I, which locks under the bed pieces; a spring, $j$, for retaining said standard in the vertical position, all constructed substantially as described for the purpose specified.

2. In a hay rack, the combination of the angle iron bed pieces, A, A, closest together at the forward end; angle iron end pieces, B, B, the outer ends of which are bent up to give the rack the appropriate form; intermediate cross pieces I, attached to the under side of said bed pieces, A, and bent up to an angle to correspond with the end pieces; side pieces, F, uniting said end pieces and cross pieces; struts, D, D; truss rods, C, containing turn-buckles, $C'$, at each end of said rack to strengthen the end pieces; struts, $d$; truss stays H, composed of twisted wire to strengthen the intermediate cross pieces, I; and slats, $h$, $h$, attached to said end pieces and passed between the wires of truss stays, H, for the purpose specified.

3. In a hay rack, the combination of the angle iron bed pieces, A, A, closest together at the forward end; angle iron end pieces, B, B, the outer ends of which are bent up to give the rack the appropriate form; intermediate cross pieces, I, attached to the under side of said bed pieces, A, and bent up to an angle to correspond with the end pieces; side pieces, F, uniting said end pieces and cross pieces; struts, D, D; truss rods, C, containing turn-buckles, $C'$, at each end of said rack to strengthen the end pieces; struts, $d$, truss stays, H, composed of twisted wire to strengthen the intermediate cross pieces, I; slats, $h$, $h$, attached to said end pieces and passed between the wires of the truss stays, H; bent cross pieces, K, riveted to the slats, $h$, and bent cross pieces, J, J', united together and attached to the under front side of the bed pieces and separated to engage each side of the bolster post, the outer ends of the strip, J, being extended and united to the slats, $h$, $h$, &c. to either side, for the purpose specified.

4. In a hay rack, the combination of the angle iron bed pieces, A, A, closest together at the forward end; angle iron end pieces, B, B, the outer ends of which are bent up to give the rack the appropriate form; intermediate cross pieces I, attached to the under side of said bed pieces, A, and bent up to an angle to correspond with the end pieces; side pieces, F, uniting said end pieces and cross pieces; struts, D, D; truss rods, C, C, containing turn buckles, $C'$, at each end of said rack to strengthen the end pieces; struts, $d$; truss stays, H, composed of twisted wire to strengthen the intermediate cross pieces, I; slats, $h$, $h$, attached to said end pieces and passed between the wires of the truss stays, H; bent cross pieces, K, riveted to the slats, $h$, and bent cross pieces, J, J', united together and attached to the under front side of the bed pieces and separated to engage each side of the bolster post, the outer ends of the strip, J, being extended and united to the slats, h, h &c. to either side; the wheel houses to the rear of said rack and composed of strips, a, a', a, united to the cross strips, b'; and rear end pieces, B, united together by the cross pieces, c, and central cross pieces, b, which pass down and unite to each bed post, A; for the purpose specified.

5. In a hay rack, the combination of the angle iron bed pieces, A, A, closest together at the forward end; angle iron end pieces, B, B, the outer ends of which are bent up to give the rack the appropriate form; intermediate cross pieces I, attached to the under side of said bed pieces, A, and bent up to an angle to correspond with the end pieces; side pieces F, uniting said end pieces and cross pieces; struts, D, D; truss rods, C, containing turn-buckles, C', at each end of said rack to strengthen the end pieces; struts, d; truss stays H, composed of twisted wire to strengthen the intermediate cross pieces, I; slats, h, h, attached to said end pieces and passed between the wires of the truss stays, H; bent cross pieces, K, riveted to the slats, H, and bent cross pieces, J, J', united together and attached to the under front side of the bed pieces and separated to engage each side of the bolster post, the outer ends of the strip, J, being extended and united to the slats, h, h &c. to either side; the wheel houses to the rear of said rack and composed of strips, a, a', a, united to the cross strips, b'; and rear end pieces, B, united together by the cross pieces, c; and central cross pieces, b, which pass down and unite to each bed post, A; the truss rods, i, corresponding to each bed piece, A, and connected to the front ends of the same, passing up under the hook, G, down, under the front cross piece, I, under the strut, M, under the rear cross piece, I, over the hook, r, and connected to the end of said bed pieces, by the eye bolts with a long thread, for the purpose specified.

6. In a hay rack, the combination of the angle iron bed pieces, A, A, closest together at the forward end; angle iron end pieces, B, B, the outer ends of which are bent up to give the rack the appropriate form; intermediate cross pieces I, attached to the under side of said bed pieces, A, and bent up to an angle to correspond with the end pieces; side pieces, F, uniting said end pieces and cross pieces; struts, D, D; truss rods, C, containing turn-buckles, C', at each end of said rack to strengthen the end pieces; struts, d; truss stays, H, composed of twisted wire to strengthen the intermediate cross pieces, I; slats, h, h, attached to said end piece and passed between the wires of the truss stays, H; bent cross pieces, K, riveted to the slats, H, and bent cross pieces J, J', united together and attached to the under front side of the bed pieces and separated to engage each side of the bolster post; the outer ends of the strip, J, being extended and united to the slats h, h &c. to either side; the wheel houses to the rear of said rack and composed of strips, a, a', a, united to the cross strips, b', and rear end pieces, B, and united together by the cross pieces, c, and central cross pieces, b, which pass down and unite to each bed piece, A; the truss rods, i, corresponding to each bed piece, A, and connected to the front ends of the same, passing up, over the hook, g, down, under the front cross piece, I, under the strut, M, under the rear cross piece, I, over the hook, r, and connected to the end of said bed pieces by eye bolts with a long thread; hooks, E, attached to said bed pieces and adapted to engage under the bolster to hold all in place, for the purpose specified.

7. In a hay rack, the combination of the angle iron bed pieces, A, A, closest together at the forward end; the angle iron end pieces, B, B, the outer ends of which are bent upward to give the rack its appropriate form; intermediate cross pieces, I, attached to the under side of said bed pieces, A, and bent up to an angle to correspond with the end pieces; side pieces, F, uniting said end pieces and cross pieces; truss rod, t, and strut, s, under said side pieces, F; struts, D, D, and truss rods, C, containing turn-buckles, C', at each end of said rack to strengthen the end pieces; struts, d, and truss stay, H, composed of twisted wire to strengthen the intermediate cross pieces, I; slats, h, h, attached to said end pieces and passed between the wires of the truss stays, H; bent cross pieces, K, riveted to the slats, h; and bent cross pieces, J, J', attached to the under front side of the bed pieces and separated to engage each side of the bolster post and united; cross pieces, J'', uniting the same together to properly engage the forward bolster, the outer ends of the strip, J, being extended and uniting to the slats, h, h &c. to either side; the wheel houses to the rear of said rack and composed of the strips, a, a', a, united to the cross strip, b', and to the rear end pieces, B, and united together by the cross pieces, c, and central cross pieces, b, which pass down and unite to each bed piece, A; the truss rods, i, corresponding to each bed piece, A, and connected to the front ends of the same passing up, over the hook, g, down, under the front cross piece, I, under the strut, M, under the rear cross piece, I, over the hook, r, and connected to the end of said bed piece by an eye bolt, i', with a long thread; hooks, E, attached to said bed pieces and adapted to engage under the bolster to hold all in place; a standard, G, pivoted on the rod, m, with rearwardly extending arms attached to the cross piece, I, which locks under the bed pieces; a spring, j, for retaining said standard in the vertical position, all constructed substantially as described for the purpose specified.

8. In a hay rack, the combination of the angle-iron bed pieces, A, nearest together at the forward end; hooks, g, and, r, above and toward each end thereof; cross pieces, I, each side of the center thereof; struts, M, secured to the under side of each of said bed pieces, truss rods for each bed piece extending lengthwise thereof and secured to each end of the said bed pieces, A, and looped over the hooks, g, and, r, and passed under the braces, I, and under the struts, M, below to strengthen said bed pieces, as specified.

9. In a hay rack, the combination of the bed pieces, A; the standard, G, pivoted at m, between said bed pieces having rearwardly projecting arms connected by the cross piece, l, which passes under the bed pieces to prevent its tipping forward; and suitable means of retaining the standard in the vertical position when desired, for use, as specified.

10. In a hay rack, the combination of the angle iron bed pieces suitably trussed; angle iron end pieces bent upward at their outer ends to give the rack the appropriate form; struts, D, projecting forwardly at each end of the rack; and truss rods, C, passing over the top of said struts and connected to the end pieces to strengthen and support the rack, as specified.

11. The combination, in a hay rack, of the bed pieces, A, A, closest together at the forward end; cross pieces, J, J', toward the forward end separated at their outer ends to engage the forward bolster stakes and hold the rack in place, as specified.

12. The combination with the hay rack, of wheel houses over the rear wheels constructed of the curved strips, a, a', a connected together with the cross strip, b, and united to the rear end of the rack; cross pieces, c, c; and cross pieces, b, uniting the central portions together and passing down and uniting to the bed pieces on that side of the rack to brace and support the wheel houses, as specified.

13. In a metal hay rack, the combination of the cross pieces of metal; truss rods, H, over suitable struts on the bed pieces connected to the opposise side of the rack and slats, h, h, to pass through said truss stays to hold the slats in position, as specified.

14. The combination, with the outer rails of a hay rack of hooks, u, and canvas to suspend under the rack to prevent loss from shelling of the grain, for the purpose specified.

In witness whereof we have hereunto set our hands and seals in the presence of two witnesses.

GEORGE A. NIDY. [L. S.]
G. E. NIDY. [L. S.]

Witnesses as to signature of George A. Nidy:
MARIAN LONGYEAR,
W. S. WOOD.

Witnesses as to signature of G. E. Nidy:
O. G. COOK,
D. W. COOK.